United States Patent
Nogrette et al.

(10) Patent No.: US 6,314,895 B1
(45) Date of Patent: Nov. 13, 2001

(54) METHOD FOR TREATING FLUID LIQUID CONTAINING A VOLATILE FRACTION

(75) Inventors: Jean-François Nogrette; Bernard Lefebvre; Jean-Guy Notelteers, all of Paris; Jean-Paul Leglise, Montesson, all of (FR)

(73) Assignee: Sarp Industries, Lemay (FR)

( * ) Notice: Subject to any disclaimer, the term of this patent is extended or adjusted under 35 U.S.C. 154(b) by 0 days.

(21) Appl. No.: 09/673,861

(22) PCT Filed: Apr. 30, 1999

(86) PCT No.: PCT/FR99/01038

§ 371 Date: Jan. 16, 2001

§ 102(e) Date: Jan. 16, 2001

(87) PCT Pub. No.: WO99/57069

PCT Pub. Date: Nov. 11, 1999

(30) Foreign Application Priority Data

Apr. 30, 1998  (FR) .................................. 98 05506

(51) Int. Cl.⁷ ....................................... F23G 3/32
(52) U.S. Cl. ................... 110/342; 110/219; 110/229; 48/127.3; 48/127.9
(58) Field of Search ................... 110/342, 218, 110/219, 229, 238, 203, 204; 48/127.3, 127.9, 197 R

(56) References Cited

U.S. PATENT DOCUMENTS

| | | | |
|---|---|---|---|
| 3,989,478 | * 11/1976 | Jones | 48/196 R |
| 4,084,521 | * 4/1978 | Herbold et al. | 110/242 |
| 4,797,091 | * 1/1989 | Neuman | 432/14 |
| 4,934,285 | * 6/1990 | Jormanainen et al. | 110/346 |
| 5,009,672 | * 4/1991 | Ruffo et al. | 44/593 |
| 5,443,021 | * 8/1995 | Trepaud | 110/219 |
| 5,601,040 | 2/1997 | McGill | 110/345 |
| 6,133,328 | * 10/2000 | Lightner | 518/700 |
| 6,189,463 | * 2/2001 | Ling et al. | 110/346 |
| 6,202,577 | * 3/2001 | Boguslavsky et al. | 110/346 |

FOREIGN PATENT DOCUMENTS

| | | | |
|---|---|---|---|
| 0 563 482 | 10/1993 | (EP) | C02F/11/12 |
| WO 93/25292 | 12/1993 | (WO) | B01D/1/14 |

OTHER PUBLICATIONS

International Search Report from PCT/FR99/01038, filed Oct. Apr. 30, 1999.

* cited by examiner

Primary Examiner—Henry Bennett
Assistant Examiner—K. B. Rinehart
(74) Attorney, Agent, or Firm—Wolf, Greenfield & Sacks, P.C.

(57) ABSTRACT

A method for treating at least one liquid fluid comprising a high water content, and including a volatile fraction and a heavy fraction, in order to separate said two fractions. Said method consists in burning at least one gas fluid, recuperating the heat released by said combustion for subsequently heating the liquid fluid. The heated liquid fluid is pressurised and then expanded so as to separate the volatile fraction from the heavy fraction. The volatile fraction is then burnt with the gas fluid. The heavy fraction is extracted from the process to be subsequently treated. The invention also concerns an installation for implementing the treatment method.

12 Claims, 2 Drawing Sheets

METHOD FOR TREATING FLUID LIQUID CONTAINING A VOLATILE FRACTION

The present invention relates to a process for treating at least one liquid fluid, and to an installation intended to implement this process.

Ever stricter antipollution standards necessitate the sorting of household and industrial waste in accordance with very precise physico-chemical criteria before it is dumped.

At the present time, one of the most commonly used method is to discard unused matter is to pack it into a cavity. This matter, considered as waste, is of varying origin. It may derive from household, industrial, agricultural environments and contain a large variety of mineral and organic products.

This waste has varying toxicity and stability from an environmental viewpoint. Some waste, considered as toxic for the environment on account of its chemical nature, may seriously disturb a natural ecosystem if it should infiltrate the latter.

Therefore, it is necessary to avoid the penetration of these components into soil structures as far as possible, and consequently it is essential for them to be retrieved for subsequent processing.

When stacked, even compressed, this waste finds itself in an anaerobic medium. Deprived of oxygen, this medium promotes the formation of organic acids during a first phase, and during a second phase the formation of a gas (biogas). Simultaneously an aqueous liquid (lixivium) is formed.

This biogas, which forms a mixture containing in particular carbon dioxide, methane, steam, hydrogen sulphide, amines and phosphines, has a relatively low energy value which nonetheless offers advantageous industrial use. In addition the biogas has the disadvantage of being corrosive and nauseating. These different disadvantages, before any industrial use is made of the potential energy of the biogas, require pre-processing which is difficult to implement owing to the high cost of biogas transport and the distance of dump sites from treatment sites and from potential users.

Also, the lixivium is generally recovered by drainage from the bottom of the cavities in which the waste is stacked. Reinforced steps to protect the environment mean that the alveoli must be made impervious to soil infiltration. This is achieved by applying clay and/or a plastic coating to the inner surface of the alveoli. This protection of the alveoli leads to an increase in the quantities of lixivium recovered compared to previously.

In addition to water, the lixivium particularly contains compounds which are toxic for the environment, containing heavy metals and/or water-soluble salts. It must therefore be given prior chemical treatment to make the pollutants it contains inert before it is discharged into the environment.

Moreover, the lixivium is known to be corrosive in respect of concrete for example.

In most of the methods used up until the present time, poor performance, high implementation costs for the treatment of this liquid and gas waste, and operating restraints form major disadvantages.

The use of conventional biological methods leads to discharging pollutants into the natural environment due to the poor yield of waste treatment.

Chemical oxidation methods require the use of additional reagents (hydrogen peroxide, ozone) whose level must be permanently adapted to the varying nature of the chemical constituents of the lixivium.

Finally, direct incineration of the lixivia requires an additional fume filtration installation to capture the particles of dried salts during incineration.

The need also subsists for a process which can be properly, easily, simultaneously, economically and therefore locally conducted without polluting the environment or nature, to treat waste of liquid type with waste of gaseous type, both being considered as polluting on account of their twofold toxic and corrosive nature, and having a high water content, which does not have the previous disadvantages.

The subject of the invention consists of a process for treating at least one non-treated liquid fluid having a high water content and containing a volatile fraction and a heavy fraction, for the purpose of separating these two fractions;

The process consists of:

a) burning at least one gaseous fluid in such manner as to produce a combustion gas, of b) recovering the heat from the combustion gas to heat the liquid fluid, of c) circulating the heated liquid fluid under pressure, of d) extracting, by evaporation, the volatile fraction from the liquid fluid, of e) oxidizing, by combustion, the components of the volatile fraction, then of f) extracting the heavy fraction in concentrated form, said process making it possible to simultaneously treat at least one liquid fluid and at least one gaseous fluid.

The subject of the invention has the advantage of avoiding the discharge of residues into the environment in liquid form, by using the energy contained in substantial quantity in the gaseous fluid. Through the use of this energy it is possible to vaporize discharges in the atmosphere.

A further advantage of the subject of the invention is the ability to treat waste of liquid type using other waste of gaseous type without adding any additional reagent, while permitting the evaporation of a fraction of the initial volume of liquid waste.

In addition, with the method of the invention it possible to oxidize by combustion the organic compounds present in the volatile fraction of the liquid waste without the need to use additional fuel, with the possibility of recovering by condensation all or part of this volatile fraction.

Finally, the treatment process of the invention is particularly adapted to variations in the composition of the liquid fluid between different extraction sites (dumps) and between different removal stages from one same site or from different sites. Contrary to a process of biological type, to obtain maximum performance, the process of the invention is fully insensitive to variations in biodegradability of the liquid fluid.

Also, the compactness of the equipment needed to apply this process facilitates truck transport of the treatment units and consequently reduces cost price.

A further subject of the invention is a treatment installation intended to implement the preceding process.

This installation is characterized in that it essentially comprises:

an inlet duct for at least one gaseous fluid, a combustion chamber, a heat recovery loop comprising at least one gas/liquid heat exchanger, a fan intended to evacuate into the atmosphere, and adjust, the combustion gases which were cooled after passing through the heat exchanger, an inlet duct for the liquid fluid, an evaporator intended to vaporize the volatile fraction of liquid fluid, a device to extract the heavy fraction.

The liquid fluid preferably circulates with the fluid that is partially rid of its volatile fraction.

The combustion of the gaseous fluid is preferably conducted at a temperature greater than approximately 900° C. and that of the volatile fraction at a temperature greater than approximately 500° C.

During recycling, the liquid fluid can preferably circulate under pressure, then be heated to a temperature greater than the evaporation temperature of the volatile fraction of the liquid fluid.

Heat recovery is made on the combustion gases preferably cooled to a temperature of less than approximately 700° C. They are preferably evacuated into the atmosphere at a temperature of approximately 200° C.

The heavy fraction particularly comprises heavy organic matter and water-soluble salts. It represents between approximately 1 and 20% of the initial volume of the liquid fluid before its treatment according to the invention.

Preferably, the fluid used in the process of the invention is biogas. This biogas may contain at least one combustible compound in gaseous form (methane for example), and may also contain in addition to this combustible compound at least one compound in gaseous form chosen from among water, air, carbon dioxide, sulphur compounds, amine compounds and their mixture.

The liquid fluid used in the process of the invention is preferably a lixivium containing water and may also contain at least one compound chosen from among sodium salts, potassium salts, calcium salts, magnesium salts, chlorine salts, sulphate salts, nitrogen compounds, ammonium salts, phosphorus salts, $FE^{++}$ ions, $Mn^{++}$ ions, $Zn^{++}$ ions, chromium, lead, copper, cadmium, nickel, organic pollutions quantifiable by measuring the Chemical Oxygen Demand, organic pollutions quantifiable by measuring the Biochemical Oxygen Demand, total organic carbon, and their mixture.

The inflow rate of non-treated liquid fluid is related to the outflow rate of the combustion gases.

BRIEF DESCRIPTION OF THE DRAWINGS

In FIG. 1 the installation is represented by the general reference 1. This installation comprises a biogas inlet duct 2. This duct 2 is connected to the lower part 3 of a combustion chamber 4. An evacuation duct 5 for hot gases is connected to the upper part 6 of combustion chamber 4. An atmospheric air inlet device 7 is connected to duct 5. An adjustment gate 7a is used to vary the air inflow rate.

Figure 1:
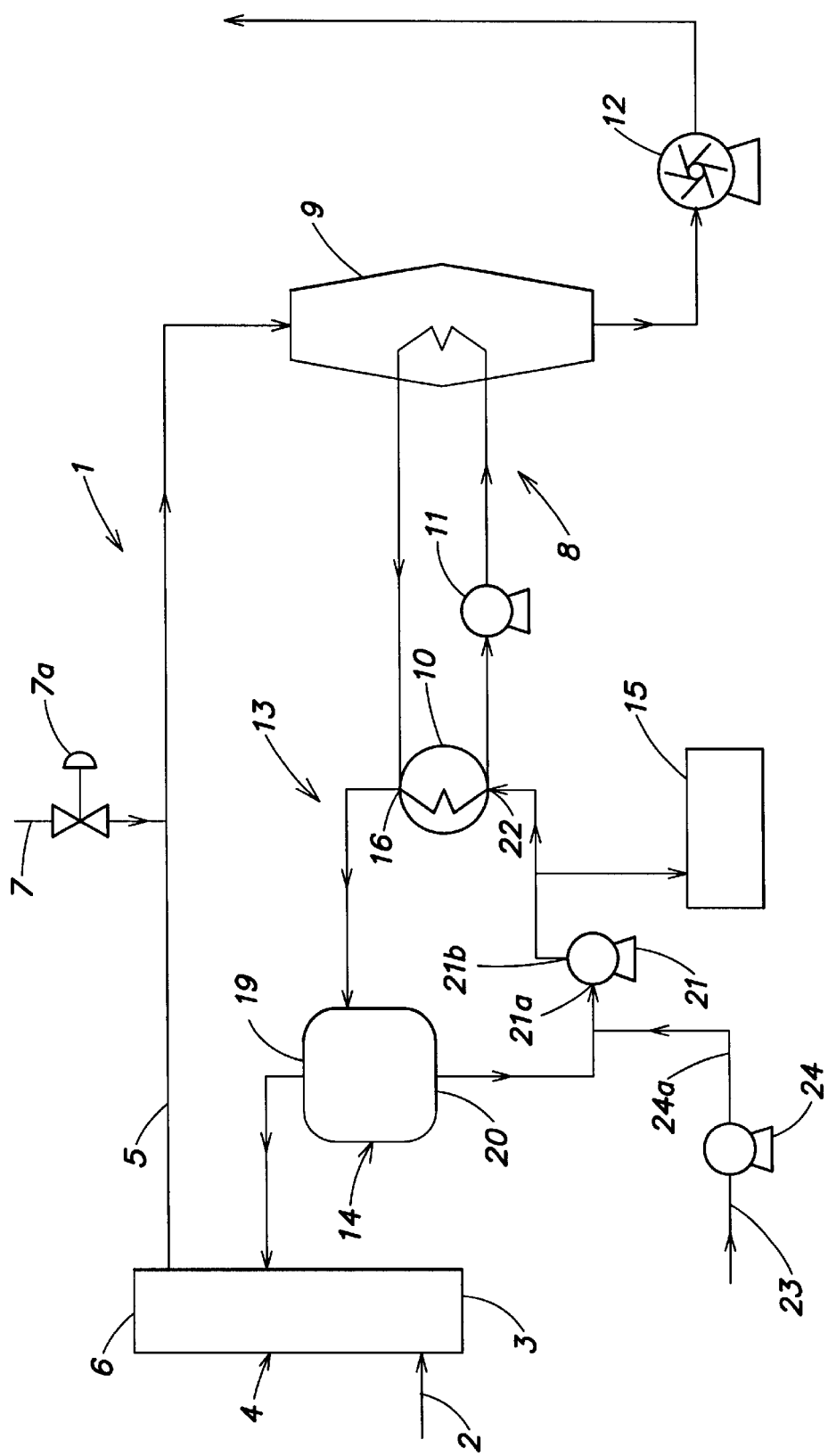
FIG. 1 shows a diagram of the main component parts of the installation used to implement the process, FIG. 2 gives a diagram of the main component parts of the installation which is used to implement the process of the invention according to a second variant.

The combustion chamber 4 may be a flare stack, an incinerator or any other similar combustion means. The combustion chamber 4 is substantially long-shaped and comprises a device intended to burn combustible gases at one of its ends. The combustible gases escape through the other end.

The combustion chamber 4 may be arranged vertically, horizontally or at an angle "a" relative to a vertical axis enabling it to provide a yield adapted to the process of the invention.

Duct 5 is connected to a heat exchange loop given the general reference 8. This loop 8 is made up of gas/liquid heat exchanger 9, a liquid/liquid exchanger 10, and a circulation pump 11.

The heat exchanger 9 is connected by means of a fan 12 to the outside.

The installation of the invention also essentially comprises a circuit given the general reference 13.

This circuit 13 is made up of the heat exchanger 10, an evaporator 14 and an extraction device 15 to extract the heavy fraction of lixivium. The evaporator 14 comprising an evaporation chamber (not shown) is made of corrosion-resistant material such as steel or alloyed steel. The choice of the type of material is dependent upon the chemical nature of the lixivium to be treated.

The outlet 16 of the heat exchanger 10 is connected by means of successive pipes to the evaporator 14. The upper part 19 of the evaporator 14 is connected by means of a pipe to the combustion chamber 4 at sufficient distance from the combustion flame to allow proper, simultaneous combustion of the volatile fraction of the lixivium and of the biogas.

The lower part 20 of the evaporator 14 is connected by means of a duct to inlet 21a of a pump 21. The heavy fraction still containing volatile compounds is retrieved and then recycled. The outlet 21b of pump 21 is connected by means of a duct to the inlet 22 of the heat exchanger 10.

An inlet duct 23 supplies the treatment installation with lixivium to be treated by means of a pump 24 in order to maintain a constant total quantity of lixivium to be treated. The outlet 24a of pump 24 is connected by a pipe to inlet 21a of pump 21.

The temperature of the non-treated lixivium, under pressure, ranges from approximately 10° to 30° C.

The extraction device 15 is connected by means of a pipe to outlet 21b of pump 21.

When the installation is in operation, pipe 2 supplies the lower part 3 of combustion chamber 4 with biogas. The hot gases, derived from combustion and at a temperature greater than approximately 900° C., are evacuated via the upper part 6 of the combustion chamber 4 towards the heat exchanger 9. The heat released is transmitted to the lixivium to be treated via the heat exchange loop 8.

The hot gases leaving the combustion chamber 4 are partially cooled to a temperature ranging from approximately 700° C. to 200° C. through the supply of air from the atmosphere, before entering the heat exchanger 9 so as to be compatible with the material forming exchanger 9. On leaving the exchanger, the temperature of the gases is approximately 200° C. This temperature avoids the formation of a plume due to the presence of steam.

Pump 11 circulates a loop of liquid fluid whose role is to "buffer" at a temperature of approximately less than 175° C. any possible heat fluctuations due to variations in the quantity of lixivium. This prevents the lixivium to be treated from being vaporized on the exchange walls with the risk of fouling the inner walls.

The lixivium to be treated, reheated by means of heat exchanger 10, circulates under pressure in circuit 13.

This, heated, lixivium subsequently evaporates in evaporator 14.

The heat released is used to vaporize the volatile fraction of the lixivium. The volatile fraction produced during evaporation then leaves under slight overpressure through the upper part 19 of evaporator 14 and is then added to the combustion chamber 4 beyond the flame in such manner that the quality of combustion of the biogas is not affected.

The volatile compounds carried with the steam are then oxidized at a temperature of more than approximately 500° C. During this oxidation, the polluting molecules are destroyed by thermal oxidation. The energy released during the combustion of these volatile gases is mixed with the energy derived from the combustion of the biogas and is then recovered as previously described.

The heavy fraction of the non-evaporated lixivium is chiefly a mixture of organic matter, solids in suspension and salts. This fraction concentrates in the lower part 20 of the evaporator 14 and is sequentially extracted from the installation by means of device 15 to undergo subsequent specific treatment. Extraction is determined in relation to the temperature of the lixivium present in evaporator 14. The temperature is dependent on the concentration of heavy fraction. The indications given by regular follow-up of the temperature in evaporator 14 can be completed by regular measurements of lixivium resistivity and viscosity.

The concentrated heavy fraction may contain up to 100 g/l of dissolved salts (essentially calcium and sodium chlorides) and heavy organic matter.

Pump 21 is used to circulate and mix the heavy fraction still containing volatile compounds with the non-treated lixivium, the mixture being under pressure.

Figure 2:
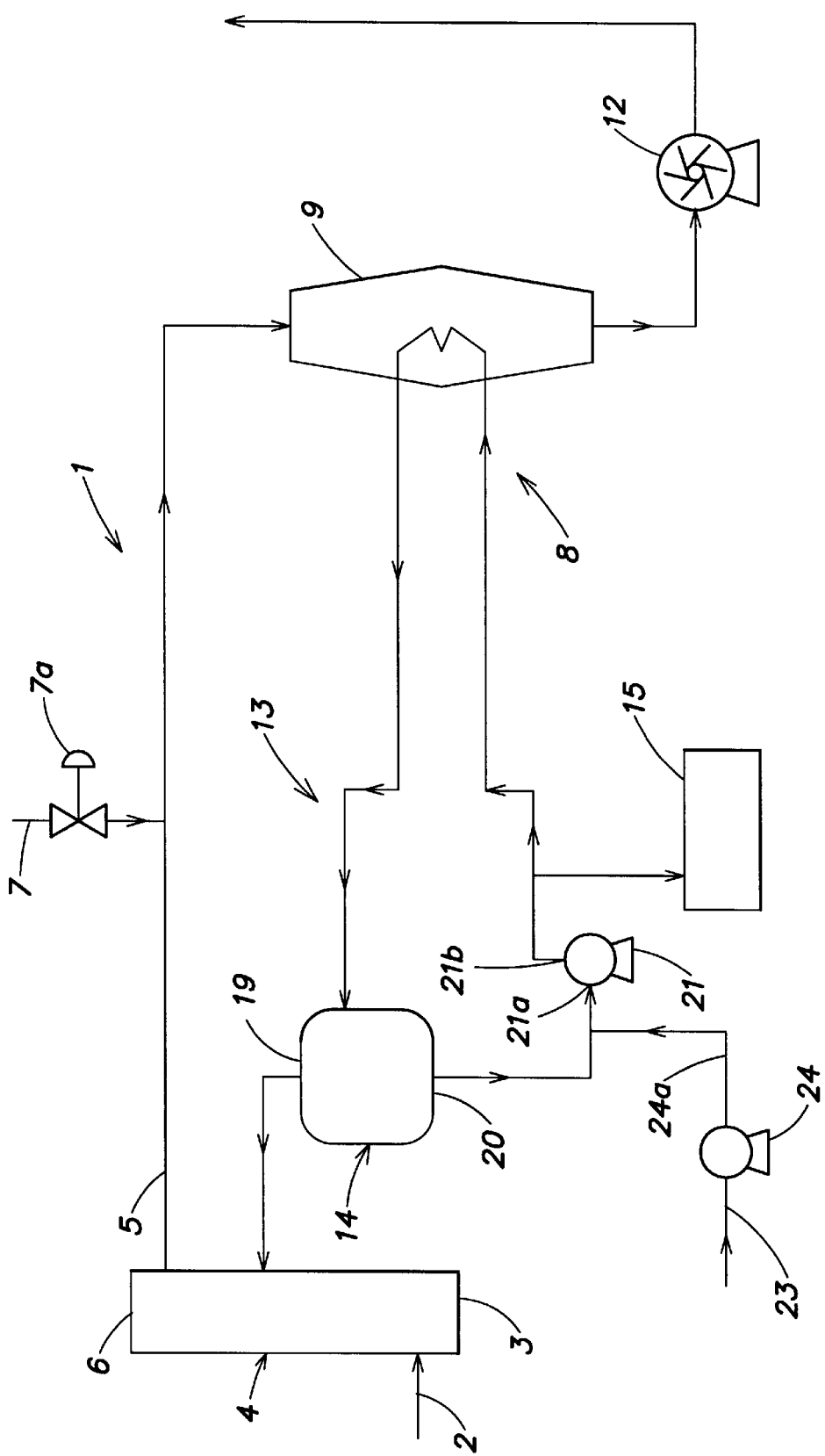

As can be seen in FIG. 2, the heat exchange loop, generally denoted 8, only comprises one gas/liquid heat exchanger 9.

In this event, the inlet and outlet temperatures of the different fluids (liquid, gaseous) are identical to those given in FIG. 1.

The lixivium is reheated by crossing through the heat exchanger 9. The temperature of the combustion gases on entering the exchanger lies between approximately 700° C. and 200° C.

What is claimed is:

1. Treatment process for at least one non-treated liquid fluid having a high water content and containing a volatile fraction with components and a heavy fraction, for the purpose of separating these two fractions, consisting of:

burning at least one gaseous fluid in such manner as to produce a combustion gas, of recovering the heat from the combustion gas to heat the liquid fluid, of circulating the re-heated liquid fluid under pressure, of extracting the volatile fraction from the liquid fluid by evaporation, of causing the non-treated liquid fluid to circulate with the liquid fluid partly rid of its volatile fraction by evaporation, of oxidizing by combustion the components of the volatile fraction, then of extracting the heavy fraction in concentrated form, said process allowing the simultaneous treatment of at least one liquid fluid and at least one gaseous fluid.

2. Process according to claim 1, characterized in that the combustion of the gaseous fluid is conducted at a temperature greater than approximately 900° C.

3. Process according to claim 1, characterized in that the combustion of the volatile fraction of the liquid fluid is conducted at a temperature greater than approximately 500° C.

4. Process according to claim 1, characterized in that the liquid fluid circulates under pressure, and is then heated to a temperature greater than the evaporation temperature of the volatile fraction of the liquid fluid.

5. Process according to claim 1, characterized in that heat recovery is made on the combustion gases cooled to a temperature of less than approximately 700° C., and in that said combustion gases are evacuated into the atmosphere at a temperature of approximately 200° C.

6. Process according to claim 1, characterized in that the heavy fraction, containing water-soluble salts and heavy organic matter, represents between approximately 1 and 20% of the initial volume of the liquid fluid before treatment.

7. Process according to either of claims 1 or 2, characterized in that the gaseous fluid is biogas containing at least one combustible compound in gaseous form, which may be associated with at least one other compound in gaseous form chosen from among water, carbon dioxide, air, sulphur compounds, amine compounds, and mixtures thereof.

8. Process according to claim 1, characterized in that the liquid fluid is a lixivium containing water, and at least one compound chosen from sodium salts, potassium salts, calcium salts, magnesium salts, chlorine salts, phosphorus salts, $Fe^{++}$ ions, $Mn^{++}$ ions, $Zn^{++}$ ions, chromium, lead, copper, cadmium, nickel, organic pollutions quantifiable by measuring the Chemical Oxygen Demand, organic pollutions quantifiable by measuring the Biological Oxygen Demand, total organic carbon, and mixtures thereof.

9. Process according to any of claims 1, 2, 4 or 8, characterized in that the inflow rate of the non-treated liquid fluid relates to the outflow rate of the combustion gases.

10. Installation intended to implement the process according to claims 1–6, or 8, characterized in that the installation essentially comprises:

an inlet duct (2) for at least one gaseous fluid, a combustion chamber (4), a heat recovery loop (3) comprising at least one gas/liquid heat exchanger (9), a fan (12) intended to evacuate into the atmosphere, and adjust, the combustion gases derived from the combustion chamber (14), which were cooled after passing through the heat exchanger (9), an inlet duct (23) for the liquid fluid, an evaporator (14) intended to vaporize the volatile fraction of the liquid fluid, at least one liquid/liquid heat exchanger (10), an extraction device (15) for the heavy fraction.

11. Installation according to claim 10, characterized in that the installation also comprises at least one atmospheric air inlet device (7) fitted with at least one adjusting gate (7a) intended to cool the hot combustion gases derived from the combustion chamber (4) by dilution with atmospheric air.

12. Installation according to claim 11, characterized in that the evaporator (14) comprises:

a) an evaporation chamber made up of an upper part (19) from which the volatile fraction is evacuated towards the combustion chamber (4) where the volatile fraction is to be burnt, and a lower part (20) from which the heavy fraction still containing volatile compounds is recovered and then recycled, b) an inlet pump (24) for the non-treated liquid fluid that is under pressure and at a temperature ranging from approximately 10 to 30° C., in order to maintain a constant total quantity of liquid fluid to be treated, c) a circulation pump (21) used to circulate and mix the heavy fraction still containing volatile compounds with the non-treated liquid fluid.

* * * * *